(12) United States Patent
Hidaka et al.

(10) Patent No.: US 10,540,717 B2
(45) Date of Patent: Jan. 21, 2020

(54) FINANCIAL PRODUCTS TRADING SYSTEM AND FINANCIAL PRODUCTS TRADING CONTROL METHOD

(71) Applicants: Hitachi, Ltd., Tokyo (JP); Tokyo Stock Exchange, Inc., Tokyo (JP)

(72) Inventors: Yuki Hidaka, Tokyo (JP); Tsuyoshi Tsukada, Tokyo (JP); Kazuhiko Omata, Tokyo (JP); Yoshihide Sato, Tokyo (JP); Shinobu Sakamoto, Tokyo (JP)

(73) Assignees: HITACHI, LTD., Tokyo (JP); TOKYO STOCK EXCHANGE, INC., Tokyo (JP)

( * ) Notice: Subject to any disclaimer, the term of this patent is extended or adjusted under 35 U.S.C. 154(b) by 153 days.

(21) Appl. No.: 15/127,925

(22) PCT Filed: Jun. 24, 2014

(86) PCT No.: PCT/JP2014/066731
§ 371 (c)(1),
(2) Date: Sep. 21, 2016

(87) PCT Pub. No.: WO2015/198400
PCT Pub. Date: Dec. 30, 2015

(65) Prior Publication Data
US 2017/0124648 A1    May 4, 2017

(51) Int. Cl.
*G06Q 40/04* (2012.01)
(52) U.S. Cl.
CPC .................... *G06Q 40/04* (2013.01)
(58) Field of Classification Search
CPC ....................................................... G06Q 40/04
(Continued)

(56) References Cited

U.S. PATENT DOCUMENTS 6,697,836 B1  2/2004 Kawano et al.
2001/0043614 A1  11/2001 Viswanadham et al.
(Continued)

FOREIGN PATENT DOCUMENTS

JP    H08-106501 A    4/1996
JP    2002-269059 A    9/2002
(Continued)

OTHER PUBLICATIONS

Second Examination Report issued in corresponding Australian application No. 2014398480 dated Oct. 25, 2017.
(Continued)

*Primary Examiner* — William E Rankins
(74) *Attorney, Agent, or Firm* — Foley & Lardner LLP (57) ABSTRACT

A securities trading system 10 which is an example of an financial products trading system includes: a switch 100 including a processor 104 which checks order issue information included in each of order messages received from a participant terminal 300 against a server management table 125, determines the address of a trading server 200 to which the order message is to be sorted, delivers the order message, receives a notification of a result of a predetermined process for the delivered order message from the trading server 200, and sends the notification to the participant terminal 300; and the trading server 200 including a processor 204 which performs a predetermined error check on each of the delivered order messages, sends the switch 100 an error notification or an order reception notification depending on a result of the error check, performs an execution process for each of the order messages whose result of the error check is normal, and sends the switch 100 an execution notification depending on the execution process.

10 Claims, 7 Drawing Sheets

(58) Field of Classification Search
USPC .......................................................... 705/37
See application file for complete search history.

(56) References Cited

U.S. PATENT DOCUMENTS

| | | | | |
|---|---|---|---|---|
| 2004/0148487 | A1* | 7/2004 | Mori .................... | G06F 16/9014 711/216 |
| 2007/0226744 | A1 | 9/2007 | Callaway et al. | |
| 2011/0320549 | A1* | 12/2011 | Ohyama ................. | H04L 45/00 709/206 |
| 2013/0325684 | A1* | 12/2013 | Vogler .................... | G06Q 40/04 705/37 |
| 2014/0075505 | A1* | 3/2014 | Subramanian ...... | H04L 12/4641 726/3 |
| 2015/0134821 | A1* | 5/2015 | Ogata ................. | H04L 41/0893 709/225 |

FOREIGN PATENT DOCUMENTS

| | | |
|---|---|---|
| JP | 2002-324022 A | 11/2002 |
| JP | 2006-293852 A | 10/2006 |
| JP | 2010-211274 A | 9/2010 |
| KR | 102000006255 | 10/2000 |
| KR | 102002003707 | 5/2002 |
| KR | 102012005384 | 5/2012 |

OTHER PUBLICATIONS

Notification of Reason for Refusal and its English translation thereof issued in corresponding Korean patent application No. 10-2018-7020243 dated Aug. 20, 2018.
Notice of Final Rejection issued in corresponding Korean patent application No. 10-2016-7025911 dated Jan. 31, 2018.
Korean Office Action issued in corresponding application No. 9-5-2017-057863553 dated Aug. 21, 2017.
Notice of Final Rejection (Re-Examined) and its English translation thereof issued in corresponding Korean patent application No. 10-2016-7025911 dated Apr. 13, 2018.
Extended European Search Report issued in corresponding application No. 14895810 dated Nov. 8, 2017.
Singaporean Written Opinion issued in corresponding application No. 11201607905V dated Nov. 15, 2017.
Office Action dated Dec. 3, 2018 in the corresponding Chinese Patent Application No. 201480077116.3 with its English translation.
PCT International Search Report issued in application No. PCT/JP2014/066731 dated Sep. 2, 2014.
Office Action received in the corresponding European application No. 14895810 dated Mar. 27, 2019.
Office Action issued in corresponding Chinese application No. 201480077116.3 dated Jun. 18, 2019, with English translation.
Office Action issued in corresponding Korean application No. 10-2018-7020243 dated Jun. 7, 2019, with English translation.

\* cited by examiner

SERVER MANAGEMENT TABLE 125

| ISSUE CODE | SORTING DESTINATION TRADING SERVER |
|---|---|
| 123 | ***.0.0.1/··· |
| 456 | ***.0.0.2/··· |
| 789 | ***.0.0.3/··· |
| UNKNOWN | ***.0.0.4/··· |
| ··· | ··· |

FIG. 3

PARTICIPANT MANAGEMENT TABLE 126

| PARTICIPANT TERMINAL IP ADDRESS | PARTICIPANT TERMINAL ID |
|---|---|
| yyy.0.0.1··· | 22222 |
| yyy.0.0.2··· | 22200 |
| yyy.0.0.3··· | 22210 |
| ··· | ··· |

FINANCIAL PRODUCTS TRADING SYSTEM AND FINANCIAL PRODUCTS TRADING CONTROL METHOD

TECHNICAL FIELD

The present invention relates to a financial products trading system and a financial products trading control method. Note that "financial products trading" in the present invention refers to securities trading and derivatives trading defined in the Financial Instruments and Exchange Act and to commodity derivatives trading defined in the Commodity Derivatives Act.

BACKGROUND ART

In recent financial products trading, there is performed so-called algorithmic trading in which a computer automatically performs ordering for financial products trading based on the price and the trading amount. For example, the algorithmic trading based on stock prices and volumes is performed in a securities market. Order processes by the computer are performed at high speed, and intervals of message transmission are far shorter than those in the case where the trading is performed by humans. Accordingly, financial products trading systems including securities trading systems forming the securities market have to match an enormous number of received trading orders in a short period and quickly perform processes such as executions. A trend of increases in the frequency and volume of trading orders is expected to grow stronger in the future with sophistications of functions of machines and communication environments used by market participants.

The following conventional technique is proposed as a technique for preventing poor response time to process such a large volume of messages. Specifically, there is proposed a system (see PTL 1) and the like which determines a work group relating to a received message based on header information in a transmission frame of the message and determines a destination server operating for the determined work group as a destination server to which a client terminal device being a source of the message is to be connected.

CITATION LIST

Patent Literature

PTL 1Japanese Patent Application Laid-open Publication No. 2002-269059

SUMMARY OF INVENTION

Technical Problem

A current securities trading system which is an example of the financial products trading system mainly includes a GW (Gate Way) server which is linked to terminals of market participants via dedicated lines, multiple order management servers which receive order messages sorted by the GW server, and trading servers which perform execution and other processes for the order messages delivered from the order management servers.

In such a configuration, the GW server which receives the order messages from the terminals of the market participants performs a series of processes such as performing a format check and a logical check on the order messages, sending an error message for an error in these checks, sending an order reception notification for a massage passing the checks, routing the order messages to the order management servers based on issue information included in the order messages, transferring execution notifications to the terminals of the market participants, and creating a journal. Meanwhile, the order management servers receive the order messages sorted by the GW server, deliver the order messages to the trading servers, and return the execution notifications depending on results of execution processes in the trading servers to the GW server.

The GW server and the order management servers described above are apparatuses which operate under control of an OS (Operating System) and implement functions to execute the series of processes in a software level. In a situation where a large volume of order messages are to be processed at high frequency, the latencies in these apparatuses tend to increase. Moreover, the current securities trading system is configured such that the GW server and the trading servers exchange data, and the latencies occurring in the respective apparatuses may affect each other and result in further latency increase. Meanwhile, when the functions of the apparatuses or the network between the apparatuses are enhanced to avoid occurrence of such latencies, a large increase in running cost is almost inevitable. Similar problems occur also in financial products trading systems other than the securities trading system.

In view of this, an object of the present invention is to provide a technique which can efficiently avoid an increase of latency caused by highly-frequent processes for a large volume of order messages in a financial products market.

Solution to Problem

A financial products trading system of the present invention for solving the problems described above includes:
  switch including
    a memory which stores a server management table storing addresses of trading servers provided respectively for types of issues (names of financial products) to be traded in financial products trading, and
    a processor which checks order issue information included in each of order messages received from a participant terminal against the server management table in the memory, determines the address of the trading server to which the order message is to be sorted, delivers the order message to the determined address, receives a notification of a result of a predetermined process for the delivered order message from the trading server, and sends the notification to the participant terminal; and
  the trading servers each including
    a communication device which exchanges messages with the switch, and
    a processor which performs a predetermined error check on each of the order messages delivered from the switch, sends the switch an error notification or an order reception notification depending on a result of the error check, performs an execution process for each of the order messages whose result of the error check is normal, and sends the switch an execution notification depending on the execution process.

Moreover, a financial products trading control method of the present invention comprises:
  causing a switch including a memory which stores a server management table storing addresses of trading servers provided respectively for types of issues of financial products to check order issue information included in each of order messages received from a participant terminal against the server management table in the memory, determine the address of the trading server to which the order message is to be sorted, deliver the order message to the determined address, receive a notification of a result of a predetermined process for the delivered order message from the trading server, and send the notification to the participant terminal; and causing each of the trading servers to perform a predetermined error check on each of the order messages delivered from the switch, send the switch an error notification or an order reception notification depending on a result of the error check, perform an execution process for each of the order messages whose result of the error check is normal, and send the switch an execution notification depending on the execution process.

When the financial products trading system or the financial products trading control method described above is applied to securities trading, so-called stock issues are used as the issues of financial products.

Advantageous Effects of Invention

In the present invention, it is possible to efficiently avoid an increase of latency caused by highly-frequent processes for a large volume of order messages in a financial products market.

DESCRIPTION OF EMBODIMENTS

System Configuration Example

Figure 1:
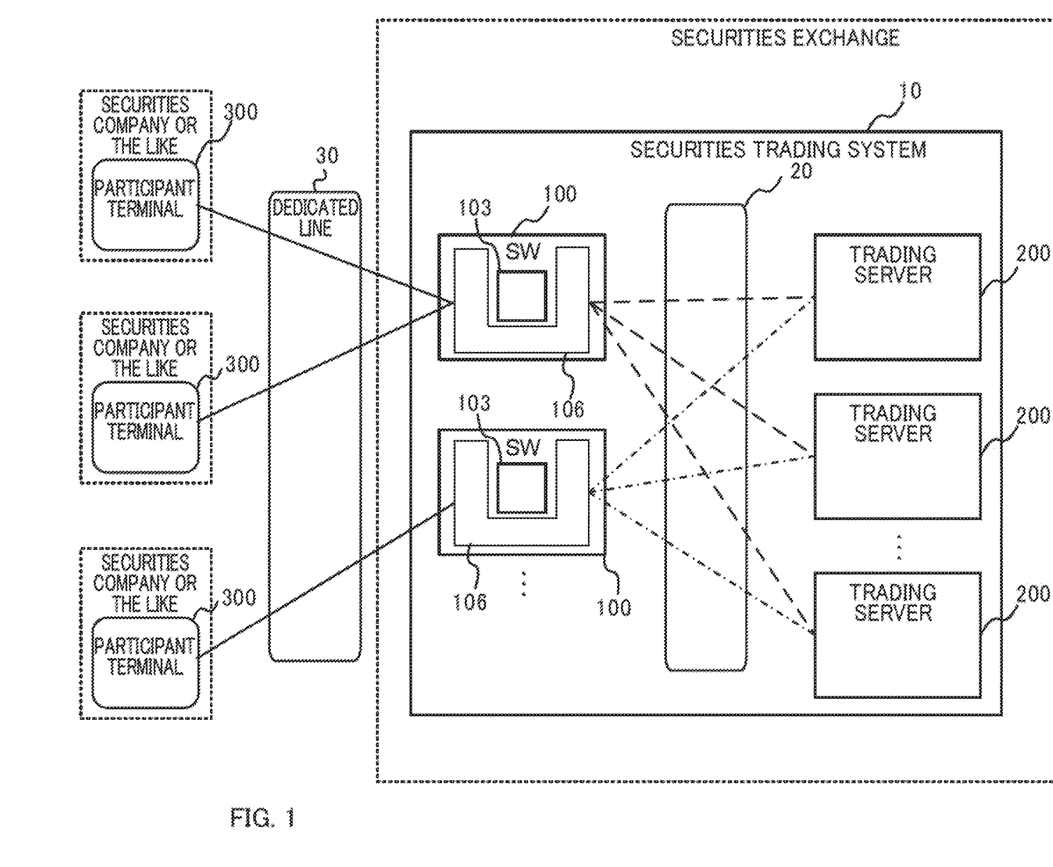
FIG. 1 is a diagram illustrating a network configuration example including a securities trading system of an embodiment.

An embodiment of the present invention is described below in detail by using the drawings. Although description is given by using securities trading as an example of financial products trading in the embodiment, the embodiment can be applied to other financial products trading. FIG. 1 is a diagram illustrating a network configuration example including a securities trading system 10 in the embodiment. The securities trading system 10 illustrated in FIG. 1 is a computer system which can efficiently avoid an increase in latency caused by highly-frequent processes for a large volume of order messages in a securities market.

The securities trading system 10 is a computer system operated by a securities exchange and includes switches 100 which are linked to participant terminals 300 in the securities market via dedicated lines 30 and multiple trading servers 200 which are linked to the switches 100 via a securities exchange internal network 20. The switches 100 described above receive messages from the participant terminals 300 coupled to LAN ports 106 via the dedicated lines 30, perform appropriate processes such as issue routing of the received messages by using switch chips 103, and deliver the messages to the trading servers 200 via the securities exchange internal network 20. In other words, the securities trading system 10 has a configuration including no GW server or order management servers which exist in a conventional system. Note that the aforementioned participant terminals 300 are computer terminals used by participants of the securities market such as securities companies to place stock trading orders.

Figure 2:
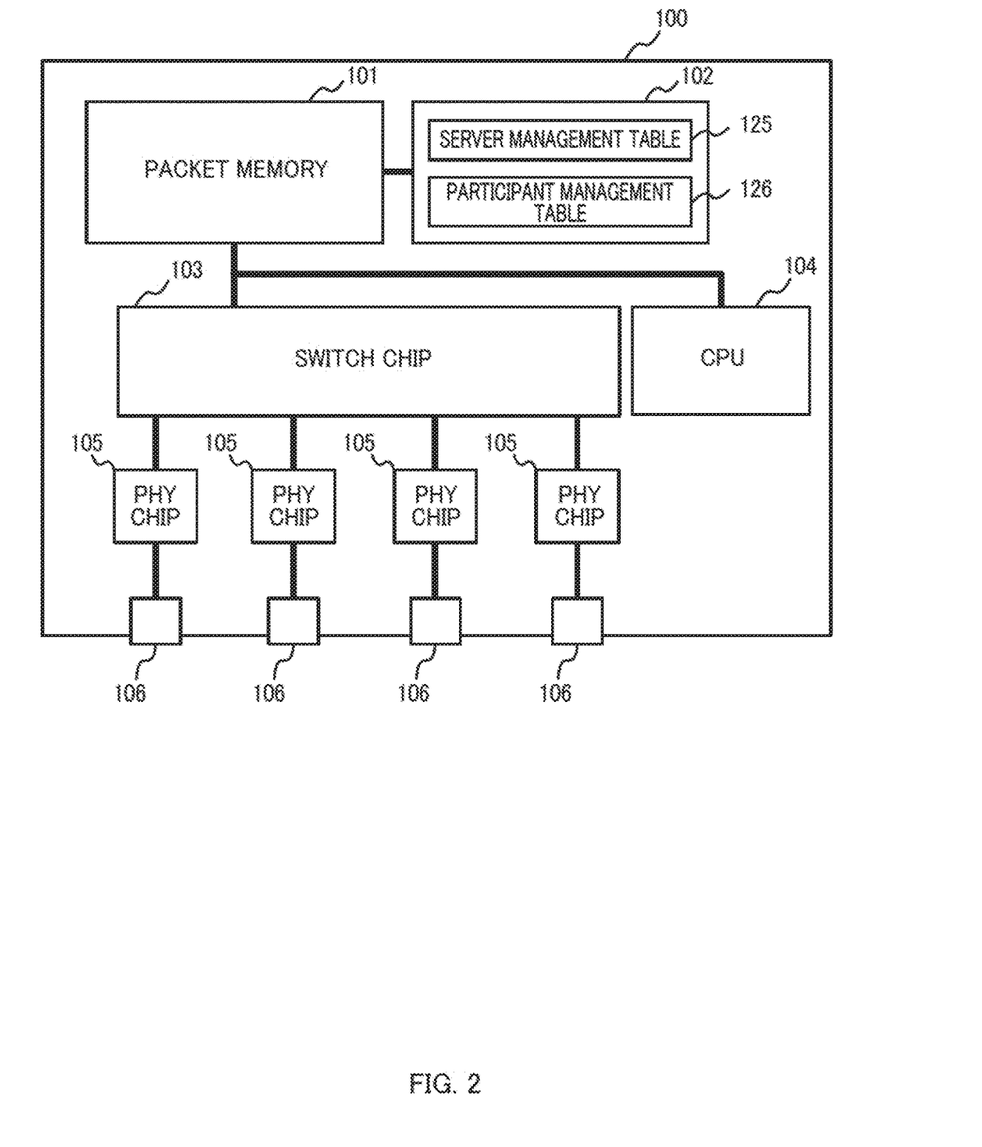
FIG. 2 is a diagram illustrating a configuration example of a switch included in the securities trading system of the embodiment.

Hardware configurations of the apparatuses included in the aforementioned securities trading system 10 are as follows. FIG. 2 is a diagram illustrating a configuration example of each of the switches 100 in the embodiment. The switch 100 in the embodiment is a so-called L3 switch (Layer 3 Switch) which has functions of both of a LAN switch and a router, and is a network device in which a forwarding function of IP packets in a conventional router is implemented by hardware and the speed of this function is greatly increased.

As illustrated in FIG. 2, main components of the switch 100 in the embodiment are a packet memory 101, an address memory 102, the switch chip 103, a CPU 104, PHY chips 105, and the LAN ports 106.

Among these components, the packet memory 101 is a memory for temporarily storing packets of the order messages inputted from the LAN ports 106. Moreover, the address memory 102 is a memory for saving a server management table 125 and a participant management table 126 which are route information referred to by the switch chip 103. The packet memory 101 and the address memory 102 may be the same physical memory or different physical memories.

Figure 3:
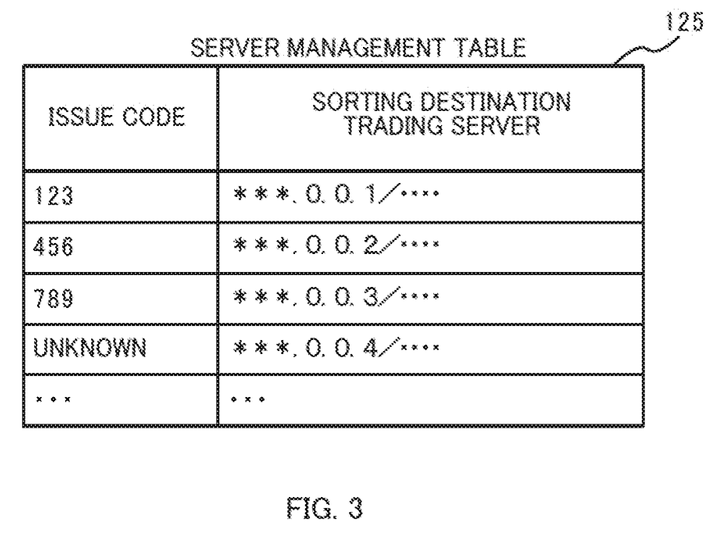
FIG. 3 is a view depicting a configuration example of a server management table in the embodiment.

As illustrated in FIG. 3, the aforementioned server management table 125 is a collection of records in which codes of stock issues handled in the securities market are associated with addresses (may also be identification numbers whose relationships with the addresses are defined separately), in the securities exchange internal network 20, of the respective trading servers 200 assigned to process the order messages for these stock issues. Moreover, the trading server 200 assigned to perform processes for unknown issue codes is also specified in the server management table 125 (in the example of FIG. 3, "*.0.0.4/ . . . " is the address of the trading server assigned to perform processes for the unknown issue codes). In this case, "unknown" refers to issues other than those set in advance such as "123." Updating (creation) of the server management table 125** is described in a process flow example 2 to be described later.

Figure 4:
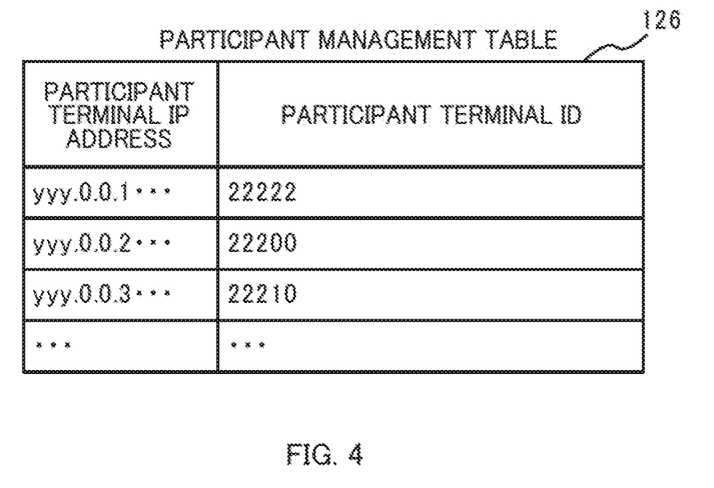
FIG. 4 is a view depicting a configuration example of a participant management table in the embodiment.

As illustrated in FIG. 4, the aforementioned participant management table 126 is a collection of records in which IP addresses of the participant terminals 300 are associated with participant terminal IDs for identifying the participant terminals.

The switch chip 103 is formed of a switch ASIC (application specific IC) and is a chip dedicated to processes of a switching operation in the L2 level and a forwarding operation in the L3 level. In the L3 level, the switch chip 103 performs general processes such as subtraction of TTL and recalculation of check sum, and also searches the route information in the address check memory 102 for the address of the trading server 200 to which the message is to be delivered, by means of hardware. Since the message relaying process is performed in the hardware level in the switch chip 103 as described above, packet loss is less likely to occur in the switch 100 which is the L3 switch, for example, when the message is sent at the maximum speed of the dedicated line 30.

The CPU 104 is a processor which performs processes of writing the route information (server management table 125, participant management table 126) into the address memory 102. The PHY chips 105 are chips responsible for physical layer processes, and are chips which shape and amplify current waveforms of the messages inputted from the LAN ports 106 into certain pulse shapes.

Figure 5:
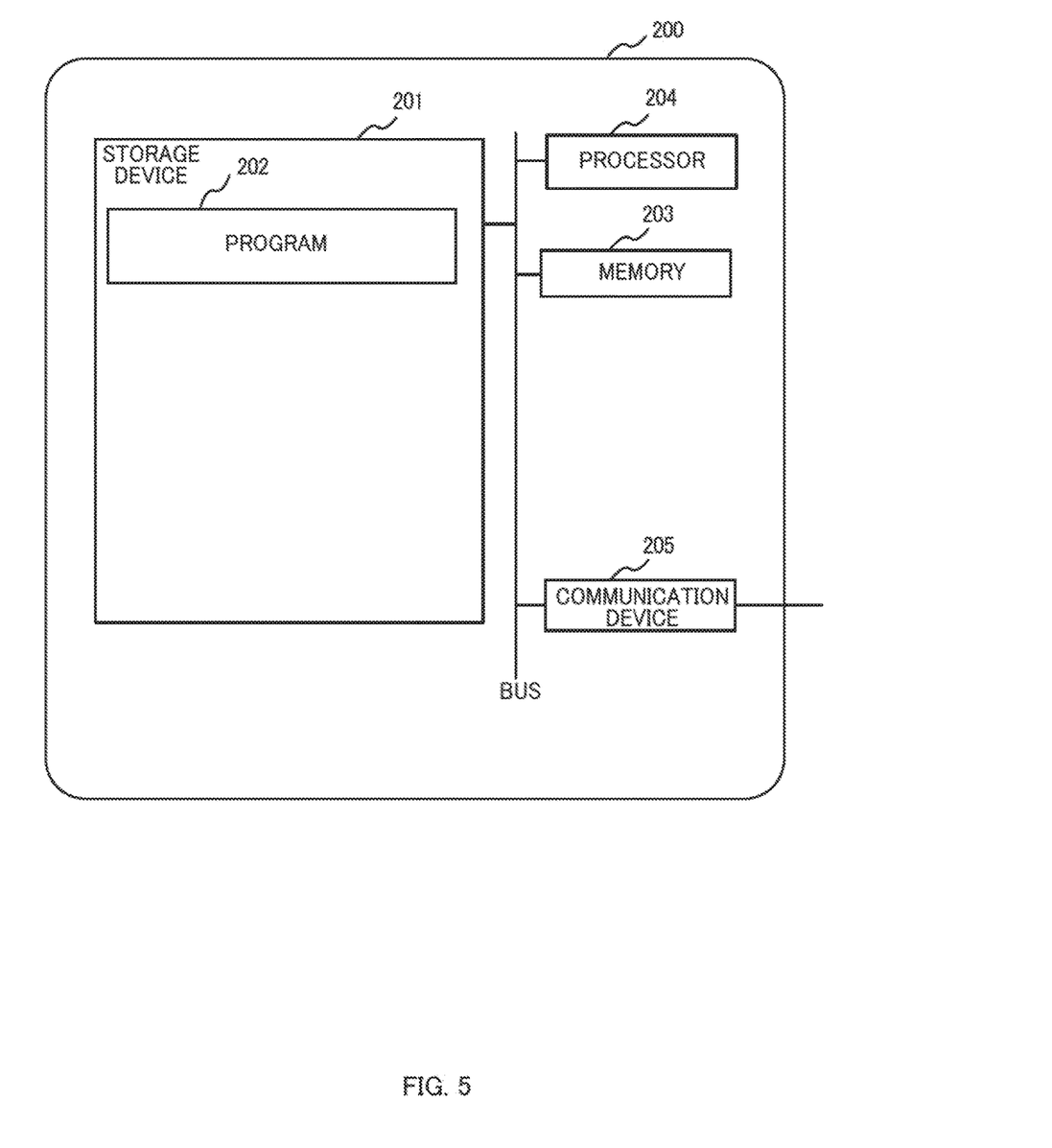
FIG. 5 is a diagram illustrating a configuration example of a trading server included in the securities trading system of the embodiment.

As illustrated in FIG. 5, each of the aforementioned trading servers 200 has a common hardware configuration of a server apparatus, and includes a storage device 201 which includes appropriate non-volatile storage elements such as an SSD (Solid State Drive) and a hard disk drive, a memory 203 which includes a volatile storage element such as a RAM, a processor 204 such as a CPU which performs overall control of the apparatus by reading a program 202 held in the storage device 201 to the memory 203 and executing the program 202 and which performs various determination, computation, and control processes, and a communication device 205 which is coupled to the securities exchange internal network 20 and which handles communication processes with the switches 100.

FUNCTION EXAMPLES

Next, description is given of functions of the apparatuses, included in the securities trading system 10 of the embodiment, that is functions of the switches 100 and the trading servers 200. Among the functions to be described below, the functions of each switch 100 are mainly functions implemented in the hardware level by the switch chip 103 as described above. Meanwhile, the functions of each trading server 200 are functions implemented by the processor 204 executing the program 202 included in the trading server 200.

Among these, the switch 100 has functions of storing the order messages received from the participant terminals 300 via the dedicated lines 30 and the LAN ports 106 in the packet memory 101, checking order issue information included in each order message against the server management table 125 in the memory 102, determining the address of the trading server 200 to which the order message is to be sorted, and delivering the order message to the determined address on the securities exchange internal network 20.

The trading server 200 has functions to execute processes of performing error checks including a format check and a logical check on each of the order messages delivered from the switches 100 via the securities exchange internal network 20, sending the switch 100 an error notification or an order reception notification depending on the results of the error checks, performing an execution process for each of the order messages whose results of the aforementioned error checks are normal, and sending the switch 100 an execution notification depending on the execution process.

The switch 100 has functions of receiving a notification of a result of a predetermined process for the aforementioned order message delivered to the trading server 200, from the trading server 200 having performed various processes for the order message, via the securities exchange internal network 20, and sending the received notification to the corresponding participant terminal 300 on the dedicated line 30 via the LAN port 106 (determined from the participant management table 126) to the corresponding participant terminal 300.

Note that the switch 100 has functions of, when the switch checks the order issue information included in the order message received from the participant terminal 300 against the server management table 125 in the address memory 102 and cannot determine the trading server 200 for the stock issue in the server management table 125, recognizing that the received order message is a message specifying an issue code not handled in the securities market, delivering the received order message to a predetermined one of the trading servers 200 in the server management table 125, receiving a notification of a result of a predetermined process for the delivered order message from the predetermined trading server 200, and sending the received notification to the participant terminal 300.

Meanwhile, the trading server 200 has functions of receiving, from the switch 100, the order message for which the switch 100 cannot determine the trading server corresponding to the order issue information as described above, performing a predetermined process such as error message generation or error correction request message generation for the received order message, and notifying the switch 100 of the error message, the error correction request message, or the like which is the result of the predetermined process.

Note that a manager or the like of the securities market updates for which stock issue each trading server 200 is assigned to perform processes, every day or at predetermined intervals, depending on, for example, unevenness in the number of trading orders among the issues (e.g. determination depending on records in a last predetermined time, or determination of an issue whose orders are expected to increase due to a certain situation), a server maintenance plan, and the like. A terminal (not illustrated) operated by the manager of the securities market sends each switch 100 the information on the stock issue assigned to each of the trading server 200 (including the address of the trading server 200), for example, every time the update is performed. Alternatively, the terminal may send each trading server 200 information on the stock issue for which the trading server 200 is assigned to perform processes, every day or at predetermined intervals. In this case, each trading server 200 preferably has functions of receiving the information on the stock issue for which the trading server 200 itself is assigned to perform processes from the aforementioned terminal, holding the information in the storage device 201 or the memory 203, and sending the switches 100 the information together with the address of the trading server 200 itself at predetermined intervals.

Meanwhile, each switch 100 has a function of receiving information which is sent from the terminal operated by the manager of the securities market or the like (or the trading server 200) and which includes the address of each trading server 200 and the information on the stock issue for which the trading server 200 is assigned to process the order messages, and storing a type of the stock issue and the address of the trading server 200 assigned to process the order messages for this stock issue which are indicated in the received information, in the server management table 125 of the address memory 102.

Process Flow Example 1

Figure 6:
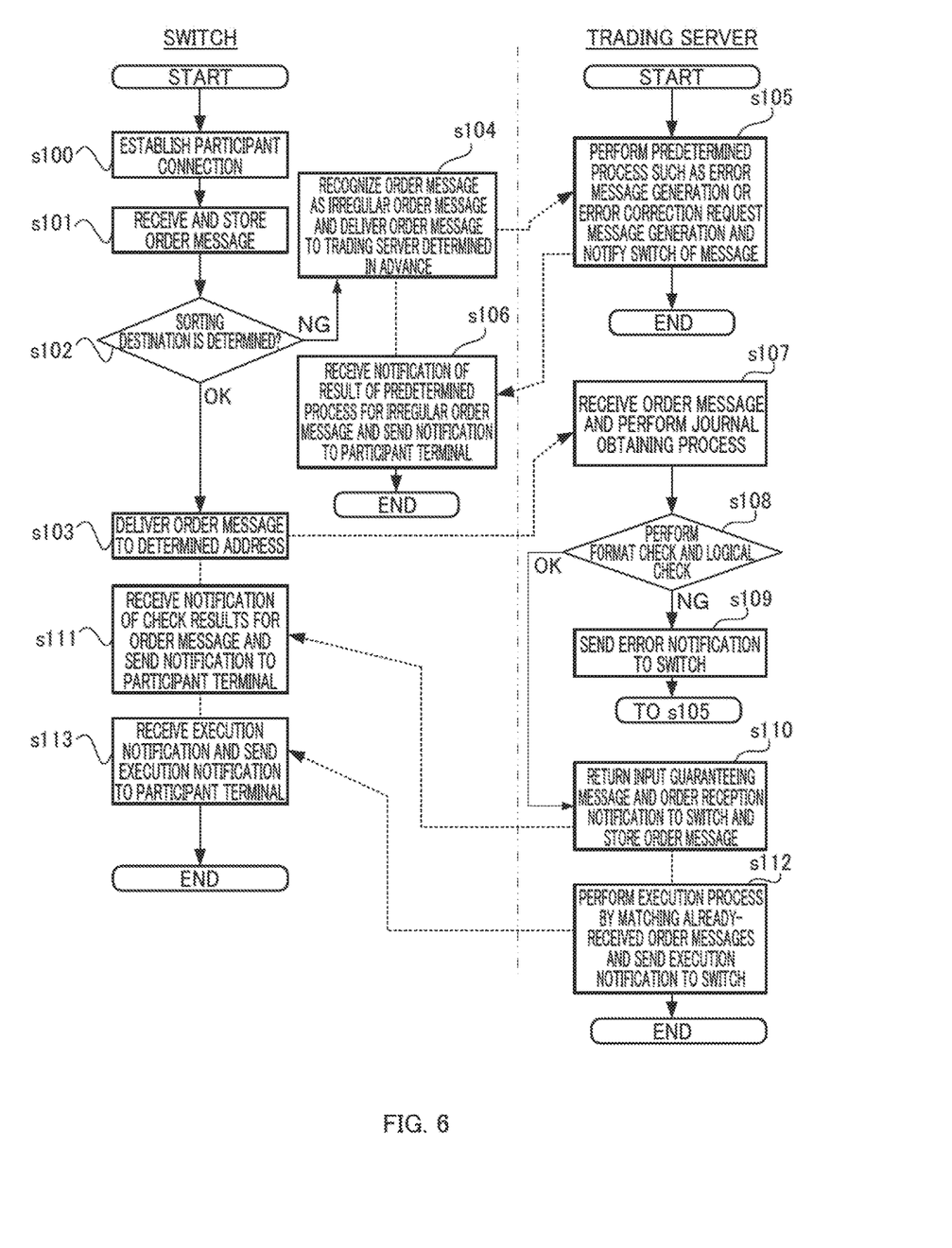
FIG. 6 is a flowchart depicting a process procedure example 1 in a securities trading control method of the embodiment.

Actual procedures in a securities trading control method in the embodiment are described below based on the drawings. FIG. 6 is a flowchart depicting a process procedure example 1 of the securities trading control method in the embodiment, and FIG. 7 is a diagram illustrating a packet configuration example of the order message in the embodiment.

First, when the switch 100 receives a connection request from any of the participant terminals 300, the switch 100 performs a connection establishment process (so-called participant control) (s100). In this case, the connection request sent by the participant terminal 300 includes an IP address of the participant terminal 300 and an IP address of the switch 100 which is information specifying a coupling destination. In this case, a participant terminal ID corresponding to the IP address may be additionally included. The switch 100 performs a predetermined connection establishment process according to a protocol of the dedicated line 30, for the participant terminal 300 specifying the switch 100 itself. Moreover, the switch 100 stores the IP address and the participant terminal ID of the participant terminal 300 in the participant management table 126, and sends the participant terminal 300 a connection establishment completion notification via the LAN port 106 and the dedicated line 30. Note that the participant terminal ID may be registered in the participant management table 126 in addition to the IP address in association therewith. In this description, the participant terminal ID is a name or the like associated with the IP address and can be omitted. The switch 100 having completed the connection establishment as described above waits in a state capable of receiving the order message from the participant terminal 300.

Meanwhile, the participant terminal 300 receives the connection establishment completion notification from the switch 100 and, for example, a program for algorithmic trading inputs order contents according to the algorithm of the program itself. Alternatively, the participant terminal 300 may display, on an output device, an input screen for a stock trading operation which is included in the storage device or the like in advance and receive an input of an order content made by an operator of the participant terminal 300. In this case, the participant terminal 300 having received the input of order for trading stocks generates an order message 70 including the order content according to the protocol of the dedicated line 30 and transmits the order message 70 to the switch 100 via the dedicated line 30.

Figure 7:
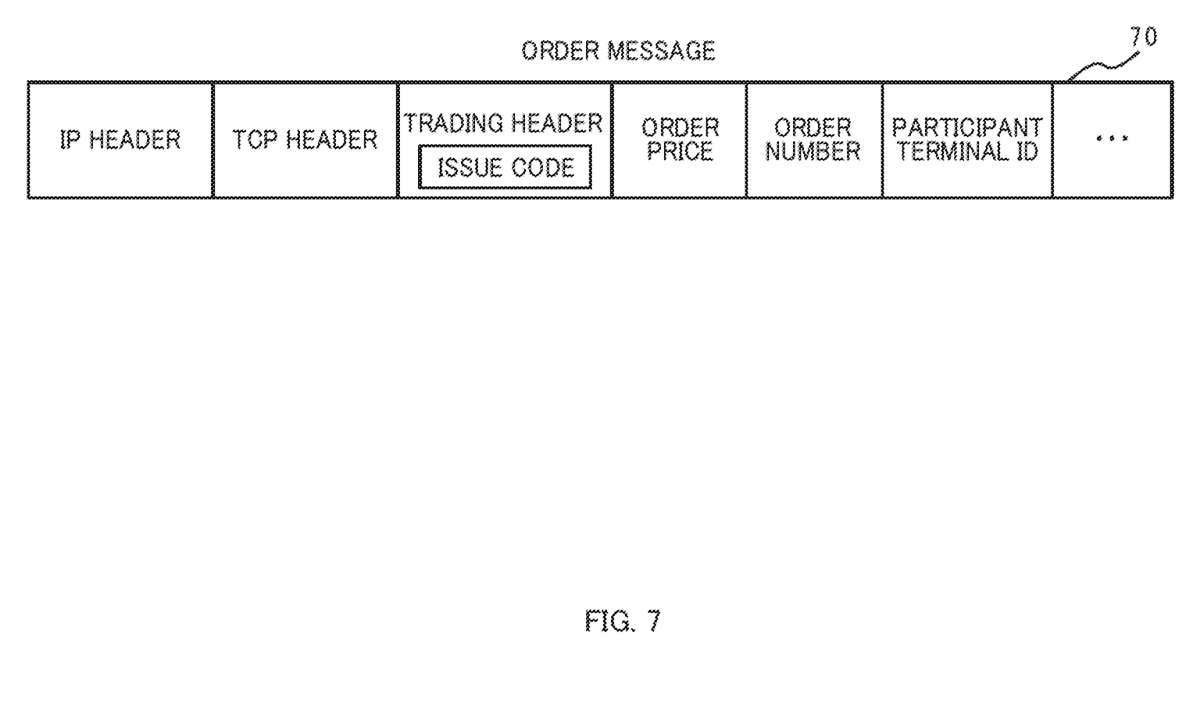
FIG. 7 is a diagram illustrating a packet configuration example of an order message in the embodiment.

As illustrated in FIG. 7, the order message 70 is an IP packet including data such as an IP header, a TCP header, a trading header, an order price, and an order number. Among these, the IP header includes general IP packet data such as TTL (Time to Live), a higher-level protocol, a check sum, the IP address of a source, that is, the participant terminal 300, and the IP address of a destination, that is, the switch 100. Moreover, the TCP header includes general TCP packet data such as a source port number (number for identifying an application in the source, that is, the participant terminal 300), a destination port number (number for identifying an application in the destination, that is, the switch 100), and a check sum. Furthermore, the trading header is a header according to a protocol of the securities trading in the securities trading system 10 and includes at least the issue code of stocks to be ordered. Moreover, the order price in the IP packet which is the order message 70 is a value of the order price for the stocks of the issue code included in the trading header, and the order number is a value of the order number for the stocks of the issue code included in the trading header. Although the IP address of the participant terminal 300 is used as the address in this case, the participant terminal ID alone or a combination of the participant terminal ID and the IP address may be used instead.

Note that it is assumed that each of the participant terminal 300, the switch 100, and the trading server 200 performs a reassembly process upon packet reception (when the received packets are fragmented packets, the packets are assembled into a message form) and a fragmentation process upon packet transmission (the message is fragmented into one or more packets according to the size of the message and transmitted) as appropriate for the received and transmitted IP packets which are the order messages 70, as in a normal packet communication procedure (the same applies hereafter).

The switch chip 103 of the switch 100 receives (the packets of) the order message 70 from the participant terminal 300 with which the connection is established, via the dedicated line 30 and the LAN port 106, and stores the order message 70 in the packet memory 101 (s101). In this case, the switch chip 103 of the switch 100 stores the order message 70 in the packet memory 101 as described above. Moreover, the switch chip 103 checks the issue code (order issue information) included in the trading header of the order message 70 against the server management table 125 in the memory 102, and determines the address of the trading server 200 to which the order message 70 is to be sorted (s102).

For example, when the issue code included in the trading header of the order message 70 is "123," the switch chip 103 of the switch 100 checks the issue code "123" against the server management table 125 illustrated in FIG. 3. Then, the switch chip 103 can determine that the address of the trading server 200 to which the order message 70 is to be sorted is "***.0.0.1/ . . . ."

When the address of the trading server 200 to which the order message 70 is to be sorted is determined as described above (s102: OK), the switch chip 103 of the switch 100 delivers the order message 70 to the determined address on the securities exchange internal network 20 (s103).

Meanwhile, when the switch chip 103 of the switch 100 checks the issue code included in the trading header of the order message 70 against the server management table 125 and cannot determine the address of the trading server 200 to which the order message 70 is to be sorted in step S102 (s102: NG), the switch chip 103 of the switch 100 recognizes that the order message 70 is an irregular order message specifying an issue code not handled in the securities market, and delivers the order message 70 to the aforementioned predetermined trading server 200 in the server management table 125 (s104).

In this case, the trading server 200 receives the irregular order message 70 delivered from the switch 100 via the securities exchange internal network 20, performs the predetermined process such as the error message generation or the error correction request message generation determined in advance for the irregular order message 70, and notifies the switch 100 of the error message, the error correction request message, or the like which is the result of the predetermined process (s105). In this case, the notification includes the participant IP address and/or the participant terminal ID.

The switch chip 103 of the switch 100 receives the notification of the result of the predetermined process for the irregular order message from the trading server 200, sends the notification to the participant terminal 300 (s106), and terminates the series of trading processes for the order message 70. The participant terminal 300 to which the notification is sent is determined from the participant IP address and/or the participant terminal ID included in the trading server 200. Note that, when the notification includes the participant terminal ID, the destination is determined in s106 by determining the IP address corresponding to the participant terminal ID by using the participant management table 126 depicted in FIG. 4. This applies also to sill and s113 to be described later.

Returning to description of processes subsequent to the process of step S103 described above, the trading server 200 receives the order message 70 delivered from the switch 100 via the securities exchange internal network 20 and stores the order message 70 in, for example, the memory 203 or the storage device 201. Moreover, the trading server 200 performs a journal obtaining process (process of obtaining a log of the order message 70 and storing the log in the storage device 201) (s107). Contents of the journal obtaining process are the same as those performed in a conventional GW server or the like.

Next, the trading server 200 performs, for the order message 70 delivered from the switch 100, a format check process of checking the correctness of the order message 70 in a format level and a logical check process of checking whether the order price specified in the order message 70 is within price range limits of the issue, checking whether the order number specified in the order message 70 is a multiple of a minimum order unit of the issue, and performing similar checks (s108).

When any of the results of the error checks, that is, the checks described above is an error (s108: NG), the trading server 200 transmits an error notification depending on the check content to the switch 100 (s109) and causes the processing to return to step s105 described above. Meanwhile, when the results of the error checks are all normal (s108: OK), the trading server 200 returns an input guaranteeing message and the order reception notification for the order message 70 to the switch 100 and stores the order message 70 in the memory 203 or the storage device 201 as the already-received order message (s110). The input guaranteeing message is normally returned first. This is because the content of the input guaranteeing message indicating the input of the order message as data is determined before the content of the order reception message indicating the reception of order is determined. Note that the reply to the switch 100 includes the participant terminal IP address and/or the participant terminal ID as in s105.

The switch chip 103 of the switch 100 receives the notification (including the input guaranteeing message) of the error check results for the order message 70 delivered to the trading server 200 in step s103 described above, from the trading server 200 (trading server 200 which has performed the error checks on the order message 70) via the securities exchange internal network 20, and sends the received notification to the participant terminal 300 on the dedicated line 30 via the LAN port 106 (determined by using the participant management table 126) to the participant terminal 300 (s111). When the order message 70 is received in the securities trading system 10, the operator or the program for the algorithmic trading of the participant terminal 300 which has sent the order message 70 waits for execution of the order. Alternatively, the operator of the participant terminal 300 or the program for the algorithmic trading inputs the next order in the participant terminal 300 on the reception of the aforementioned input guaranteeing message.

Meanwhile, the trading server 200 performs a specified execution process by matching, based on the order price and the order number, order messages which are for the same issue and which are in buying and selling relationships, out of the order messages 70 whose error check results are normal as described above and which are held as the already-received order messages, and sends the switch 100 an execution notification depending on the execution process (s112). Note that the execution notification includes the participant terminal IP address and/or the participant terminal ID as in s105 and s110.

The switch chip 103 of the switch 100 receives the execution notification sent from the trading server 200 and sends the execution notification to the participant terminal 300 on the dedicated line 30 via the LAN port 106 to the participant terminal 300 (s113), and terminates the series of trading processes for the certain order message 70. Note that the sending to the participant terminal 300 is performed for the participant terminal 300 determined from the participant terminal IP address and/or the participant terminal ID included in the execution notification. The participant terminal ID may be an ID for indentifying a logical (virtual) terminal instead of a physical terminal. In other words, an information processing apparatus operating in a virtual environment can be used as the participant terminal.

Process Flow Example 2

Figure 8:
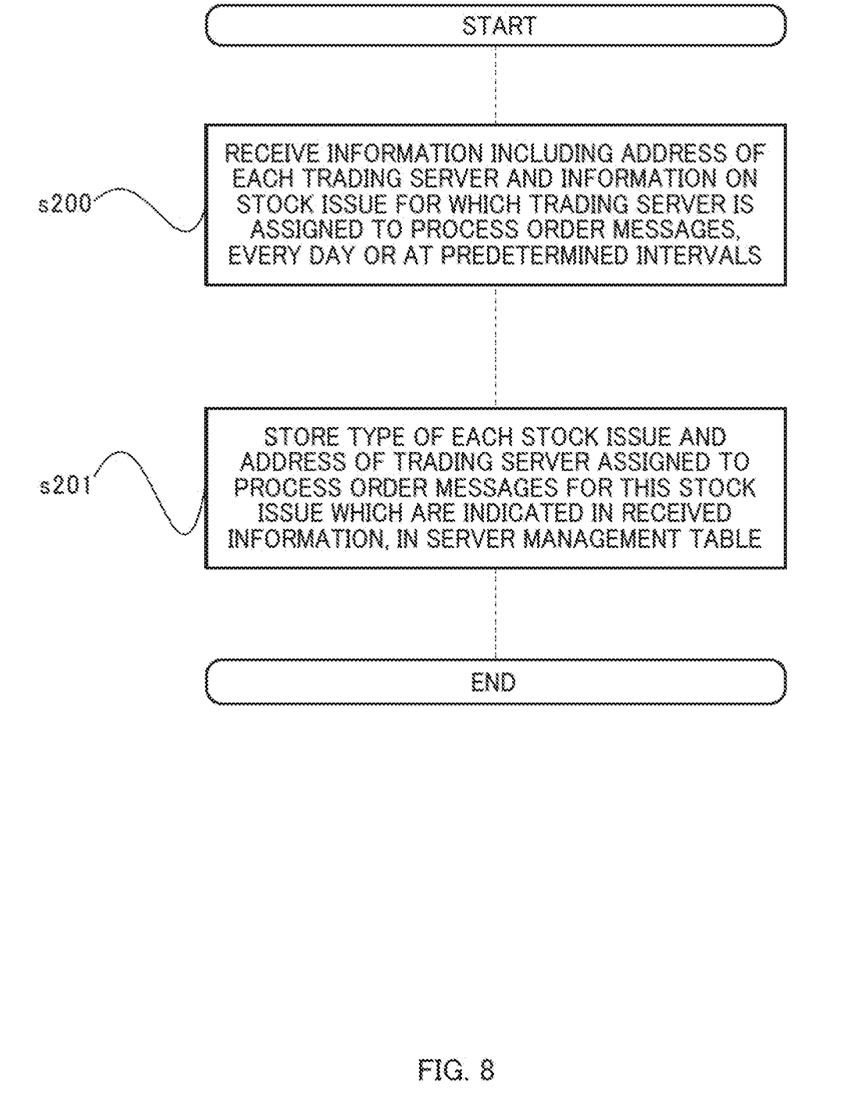
FIG. 8 is a flowchart depicting a process procedure example 2 in the securities trading control method of the embodiment.

Next, description is given of processes of storing and updating the server management table 125 in the address memory 102 of the switch 100. FIG. 8 is a flowchart depicting a process procedure example 2 of the securities trading control method in the embodiment.

The manager of the securities market or the like updates for which stock issue each trading server 200 is assigned to perform processes, every day or at predetermined intervals, depending on, for example, unevenness in the number of trading orders among the issues (e.g. determination depending on the records in the last predetermined time, or determination of an issue whose order is expected to increase due to a certain situation), a server maintenance plan, and the like.

The terminal (not illustrated) operated by the manager of the securities market sends each switch 100 the information on the stock issue assigned to each of the trading server 200 (including the address of the trading server 200), for example, every time the update is performed. Alternatively, the terminal may send each trading server 200 the information on the stock issue for which the trading server 200 is assigned to perform processes, every day or at predetermined intervals. In this case, the each trading server 200 preferably receives the information on the stock issue for which the trading server 200 itself is assigned to perform processes from the aforementioned terminal, holds the information in the storage device 201 or the memory 203, and sends the switches 100 the information together with the address of the trading server 200 itself at predetermined intervals.

Under the assumption described above, the switch chip 103 of the switch 100 receives information which is sent from the terminal operated by the manager of the securities market or the like (or the trading server 200) and which includes the address of each trading server 200 and the information on the stock issue for which the trading server 200 is assigned to process the order messages 70, every day or at predetermined intervals (s200). The switch chip 103 of the switch 100 stores the type of each stock issue and the address of the trading server 200 assigned to process the order messages for this stock issue which are indicated in the information received in step s200, in the server management table 125 of the address memory 102 (s201), and terminates the processing. The processes of steps s200 to s201 described above are performed every time the information is transmitted from the terminal operated by the manager of the securities market (or the trading server 200), and the server management table 125 is updated every day or at predetermined intervals to the latest state. Note that, although the switch chip 103 performs the processes of the switch 100 in the process flow examples 1 and 2, the CPU 104 performs other general switching processes.

Although the best mode for carrying out the present invention and the like have been specifically described above, the present invention is not limited to these modes and various changes can be made within a scope not departing from the spirit of the invention.

In the embodiment described above, it is possible to omit a conventional GW server and order management servers in the securities trading system and perform required processes with the switches and the trading servers which are network devices. In such a system configuration, the switches perform the issue routing processes of order messages conventionally performed by the GW server, at high speed, and the cause of a latency increase is appropriately suppressed. Hence, a speed high enough to sufficiently handle highly-frequent processes for a large volume of order messages can be achieved.

Moreover, the system configuration using no GW server or order management servers as described above can achieve a reduction in the number of servers, a reduction of a network between the GW server and the order management servers, and also a reduction in the number of hops due to elimination of a multi-stage configuration. This leads to suppression of latency and a reduction of apparatus running cost and the like in the system as a whole.

Accordingly, in the present invention, it is possible to efficiently avoid the latency increase caused by highly-frequent processes for a large volume of order message in the securities market.

At least the following matters are made obvious by the description. Specifically, the securities trading system of the embodiment may be configured such that the processor of each switch further performs processes of receiving the information which is sent from the trading servers or another predetermined device and which includes the types of the stock issues and the address of the trading server assigned to process the order messages for each of the stock issues, and storing the received information in the server management table.

In this configuration, the information in the server management table on which the issue routing process for the order messages are based can be obtained from the outside and updated. Hence, delivery of the order messages to the trading servers can be appropriately maintained.

Moreover, the securities trading system of the embodiment may be configured such that the processor of each trading server further performs the process of sending information to the switch at predetermined intervals, the information including the address of the trading server and the information on the stock issue for which the trading server is assigned to process the order messages.

In this configuration, the information in the server management table on which the issue routing process for the order messages are based can be periodically updated to the latest state. Hence, the delivery of the order messages to the trading servers can be appropriately maintained.

Moreover, the securities system of the embodiment may be configured such that the processor of each switch further performs, when the switch checks the order issue information included in the order message received from the participant terminal against the server management table in the memory and fails to determine the trading server for the stock issue in the server management table, delivering the order message to the predetermined trading server, receiving the notification of the result of the predetermined process for the delivered order message from the predetermined trading server, and sending the notification to the participant terminal, and the processor of the predetermined trading server further performs the processes of receiving the order message for which the switch fails to determine the trading server corresponding to the order issue information, from the switch, performing the predetermined process on the order message, and sending the switch the notification depending on the result of the predetermined process.

In this configuration, the processes for the order messages of the issue which is not handled in the securities market can be performed in the trading server without bearing unnecessary burden on the switch. Accordingly, it is possible to surely handle an irregular order message specifying an unknown issue code without impairing the high-speed processing in the switches in the system as a whole, and achieve an excellent level of services for participants of the securities market.

Moreover, the securities trading system of the embodiment may be configured such that each of the order messages and the notifications to the switch includes the participant terminal ID for identifying the participant terminal transmitting the order message, the memory of the switch stores the participant management table in which the participant terminal ID and the participant terminal IP address corresponding to the participant terminal ID are associated with each other, and the processor of the switch sends the error notification to the participant IP address associated with the participant terminal ID included in the notification to the switch of an error. In this configuration, since the identification process of participant terminal can be performed by using the ID, the efficiency and speed of the identification process can be improved.

Although the description has been given above by using securities trading as an example of the financial products trading in the embodiment, the embodiment can be also applied to a derivatives trading.

REFERENCE SIGNS LIST

10 securities trading system
20 securities exchange internal network
30 dedicated line
100 switch
101 packet memory
102 address memory
103 switch chip
104 CPU
105 PHY chip
106 LAN port
125 server management table
126 participant management table
200 trading server
201 storage device
202 program
203 memory 204 processor
205 communication device
300 participant terminal

The invention claimed is:
1. A financial products trading system comprising:
a switch including
a memory which stores a server management table storing addresses of trading servers provided respectively for types of issues of financial products, and
a processor which checks order issue information included in each of order messages received from a participant terminal against the server management table in the memory, determines the address of the trading server to which the order message is to be sorted, delivers the order message to the determined address, receives a notification of a result of a predetermined process for the delivered order message from the trading server, and sends the notification to the participant terminal; and
the trading servers each including
a communication device which exchanges messages with the switch, and
a processor which performs a predetermined error check on each of the order messages delivered from the switch, sends the switch an error notification or an order reception notification depending on a result of the error check, performs an execution process for each of the order messages whose result of the error check is normal, and sends the switch an execution notification depending on a result of the execution process for each execution process performed.

2. The financial products trading system according to claim 1, wherein the processor of the switch further performs processes of:
receiving information which is sent from the trading servers or another predetermined device and which includes the type of each of the issues of financial products and the address of the trading server assigned to process the order messages for the issue of financial products; and
storing the received information in the server management table.

3. The financial products trading system according to claim 2, wherein the processor of each of the trading servers further performs a process of sending information to the switch at predetermined intervals, the information including the address of the trading server and the information on the issue of financial products for which the trading server is assigned to process the order messages.

4. The financial products trading system according to claim 1, wherein
the processor of the switch further performs processes of:
when the processor of the switch checks the order issue information included in the order message received from the participant terminal against the server management table in the memory and fails to determine the trading server for the issue of financial products in the server management table, delivering the order message to a predetermined one of the trading servers;
receiving the notification of the result of the predetermined process for the delivered order message from the predetermined trading server; and
sending the notification to the participant terminal, and
the processor of the predetermined trading server further performs processes of:
receiving the order message for which the processor of the switch fails to determine the trading server corresponding to the order issue information, from the switch;
performing the predetermined process on the received order message; and
sending the switch the notification depending on the result of the predetermined process.

5. The financial products trading system according to claim 4, wherein
each of the order messages and the notifications to the switch includes a participant terminal ID for identifying the participant terminal transmitting the order message,
the memory of the switch stores a participant management table in which the participant terminal ID and a participant terminal IP address corresponding to the participant terminal ID are associated with each other, and
the processor of the switch sends the error notification to the participant IP address associated with the participant ID included in the notification to the switch.

6. A financial products trading control method comprising:
causing a switch including a memory which stores a server management table storing addresses of trading servers provided respectively for types of issues of financial products to
check order issue information included in each of order messages received from a participant terminal against the server management table in the memory,
determine the address of the trading server to which the order message is to be sorted,
deliver the order message to the determined address,
receive a notification of a result of a predetermined process for the delivered order message from the trading server, and
send the notification to the participant terminal; and
causing each of the trading servers to
perform a predetermined error check on each of the order messages delivered from the switch,
send the switch an error notification or an order reception notification depending on a result of the error check,
perform an execution process for each of the order messages whose result of the error check is normal, and
send the switch an execution notification depending on a result of the execution process for each execution process performed.

7. The financial products trading control method according to claim 6, wherein the switch further performs processes of:
receiving information which is sent from the trading servers or another predetermined device and which includes the type of each of the issues of financial products and the address of the trading server assigned to process the order messages for the issue of financial products; and
storing the received information in the server management table.

8. The financial products trading control method according to claim 7, wherein each of the trading servers further performs a process of sending information to the switch at a predetermined interval, the information including the address of the trading server and the information on the issue of financial products for which the trading server is assigned to process the order messages.

9. The financial products trading control method according to claim 6, wherein
the switch further performs processes of:
when the switch checks the order issue information included in the order message received from the participant terminal against the server management table in the memory and fails to determine the trading server for the issue of financial product in the server management table, delivering the order message to a predetermined one of the trading servers;
receiving the notification of the result of the predetermined process for the delivered order message from the predetermined trading server; and
sending the notification to the participant terminal, and
the predetermined trading server further performs processes of:
receiving the order message for which the switch fails to determine the trading server corresponding to the order issue information, from the switch;
performing a predetermined process on the received order message; and
sending the switch the notification depending on the result of the predetermined process.

10. The financial products trading control method according to claim 9, wherein
each of the order messages and the notifications to the switch includes a participant terminal ID for identifying the participant terminal transmitting the order message,
the memory of the switch stores a participant management table in which the participant terminal ID and a participant terminal IP address corresponding to the participant terminal ID are associated with each other, and
a processor of the switch sends the error notification to the participant IP address associated with the participant ID included in the notification to the switch.

* * * * *